United States Patent [19]

Hahm et al.

[11] 4,030,185

[45] June 21, 1977

[54] METHOD OF MANUFACTURING A BRAKE PAD ASSEMBLY FOR A SPOT-TYPE DISC BRAKE

[75] Inventors: Heinz Gunter Hahm, Frankfurt am Main; Nedo Igor Pocci, Neuenhain, both of Germany

[73] Assignee: ITT Industries, Incorporated, New York, N.Y.

[22] Filed: Sept. 29, 1976

[21] Appl. No.: 727,830

Related U.S. Application Data

[63] Continuation-in-part of Ser. No. 577,149, May 13, 1975, abandoned.

[30] Foreign Application Priority Data

May 14, 1974  Germany ......................... 2423377

[52] U.S. Cl. .................... 29/413; 29/412; 29/420.5; 29/469.5; 29/DIG. 1; 188/250 R; 188/250 G

[51] Int. Cl.² ...................................... B23P 17/02

[58] Field of Search ....... 29/412, 413, 414, DIG. 1, 29/DIG. 40, 420, 420.5, 469.5, DIG. 31, DIG. 33; 188/250 R, 250 B, 250 G, 256, 73.1, 73.2, 72.4, 251 R

[56] References Cited

UNITED STATES PATENTS

| | | | |
|---|---|---|---|
| 2,011,661 | 8/1935 | Spinosa et al. | 29/412 X |
| 2,431,774 | 12/1947 | Schumacher | 188/250 R |
| 2,791,294 | 5/1957 | Bachman et al. | 188/250 R |
| 2,793,427 | 5/1957 | Marvin | 29/420.5 |
| 2,873,517 | 2/1959 | Wellman | 29/420.5 |
| 3,198,294 | 8/1965 | Stacy | 188/250 G |
| 3,895,693 | 7/1975 | Lucien et al. | 188/73.2 X |

FOREIGN PATENTS OR APPLICATIONS

| | | | |
|---|---|---|---|
| 319,510 | 11/1902 | France | 188/251 R |
| 2,100,009 | 9/1971 | Germany | 188/73.1 |
| 493,830 | 5/1954 | Italy | 188/256 |
| 624,614 | 6/1949 | United Kingdom | 188/251 R |

*Primary Examiner*—Victor A. Dipalma
*Attorney, Agent, or Firm*—John T. O'Halloran; Alfred C. Hill

[57] ABSTRACT

The method includes the steps of forming separately a pair of spaced recesses in a carrier plate, the recesses having a parallelogram configuration other than a rectangle and a cross member therebetween providing an axis of symmetry, the recesses being symmetrically disposed with respect to the axis of symmetry to approximate a sector of a circle; pressing and age-hardening separately a plate of friction material having a thickness corresponding to the desired thickness of the friction pads; cutting at least a pair of friction pads from the plate having the dimensions and shape of the recesses; and placing and securing each of the pair of friction pads in a different one of the recesses so that the pair of friction pads are disposed symmetrically with respect to the axis of symmetry to approximate a sector of a circle.

2 Claims, 3 Drawing Figures

METHOD OF MANUFACTURING A BRAKE PAD ASSEMBLY FOR A SPOT-TYPE DISC BRAKE

CROSS-REFERENCE TO RELATED APPLICATIONS

This is a continuation-in-part application of copending application Ser. No. 577,149, now abandoned filed May 13, 1975.

BACKGROUND OF THE INVENTION

This invention relates to a method of manufacturing a brake-pad assembly for a spot-type disc brake comprising a carrier or backing plate with box-shaped recesses and friction pads inserted and secured therein.

From the German Pat. No. 1,183,806 a disc brake is known wherein the carrier plate of the brake-pad assembly is provided with box-shaped recesses which serve to receive the friction pads. The friction pads are shaped like the sectors of a circle and have at their rear sides metal supporting plates which are provided with spring clips to secure the friction pads in their box-shaped recesses. Each brake-pad assembly carries two sector-shaped friction pads secured in their associated box-shaped recesses which are disposed adjacent to one another. A cross member provided between the two box-shaped recesses defines a determined distance between the friction pads.

This brake-pad assembly has the disadvantage that the sector-shaped design of the friction pads necessitates expensive and sophisticated apparatus as well as large expenditure of work involved with the manufacture of the friction pads and the carrier plates.

SUMMARY OF THE INVENTION

Therefore, it is an object of this invention to provide a method of manufacturing a brake-pad assembly for spot-type disc brakes which affords simple and cheap manufacture and permits optimum use to be made of the space available.

A feature of the present invention is the provision of a method of manufacturing a brake-pad assembly for a spot-type disc brake having a carrier plate and a pair of friction pads comprising the steps of: forming separately a pair of spaced recesses in the carrier plate, the recesses having a parallelogram configuration other than a rectangle and a cross member therebetween providing an axis of symmetry, the recesses being symmetrically disposed with respect to the axis of symmetry to approximate a sector of a circle; pressing and age-hardening separately a plate of friction material having a thickness corresponding to the desired thickness of the pads; cutting at least the pair of pads separately from the plate having the dimensions and shape of the recesses; and placing and securing each of the pair of pads produced in the cutting step in a different one of the recesses so that the pair of pads are disposed symmetrically with respect to the axis of symmetry to approximate a sector of a circle.

The friction pads are advantageously manufactured separately from the carrier or backing plate and are connected or secured to the latter preferably by bonding. When using adhesive tape for bonding, this has the advantageous effect of noise attenuation during operation.

The division of the friction face of a brake pad into a number of sectional faces, which is achieved by using several individual friction pads, considerably reduces the risk of tear due to thermal stresses.

An economical and low-cost method of manufacture of such brake pads comprises a plate made from frictional material having a thickness corresponding to that of the desired friction pads which is manufactured in the known manner by pressing and age-hardening, and a plurality of friction pads are cut out of the plate having their final forms. Such plates have the advantage that various sizes of friction pads can be cut out and that they permit homogenous manufacture because the friction material need not flow into anchoring holes or recesses of the carrier plate which causes cavitation in the structure and consequently leads to lack of homogeneity. Further, such plates permit an improved and more even through-hardening of the friction material.

An advantageous method of cutting the friction pads out of the plate includes cutting parallel parting lines over both the whole length and the whole width of the plate with the longitudinal and transverse parting lines running at angles unequal to 90°.

In an embodiment of the brake-pad assembly constructed in accordance with this invention, the friction pads are arranged on the carrier plate in a spaced relationship to one another. This can be achieved by a cross member separating the two box-shaped recesses. The space between the two friction pads advantageously serves as a drain groove and can also be used for receiving a pad-wear arrangement.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
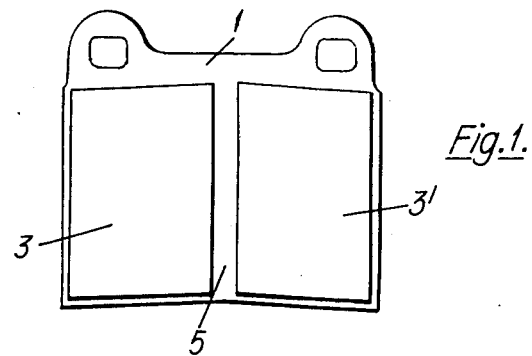
FIG. 1 is a plan view of a brake-pad assembly manufactured in accordance with the principles of the present invention.
Figure 2:
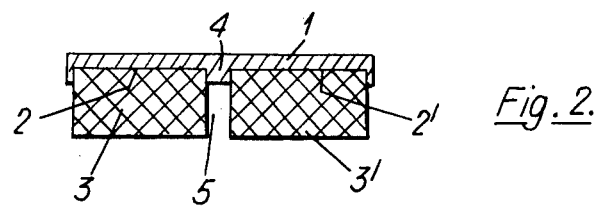
FIG. 2 is a sectional view of the brake-pad assembly of FIG. 1.

FIGS. 1 and 2 show a carrier plate 1 of the brake-pad assembly, having box-shaped recesses 2 and 2' formed therein into which friction pads 3 and 3' are inserted and secured therein by bonding. Recesses 2 and 2' and friction pads 3 and 3' have a parallelogram configuration other than a rectangle. The two box-shaped recesses 2 and 2' are separated from one another by a cross member 4 thereby providing a space 5 between the friction pads 3 and 3' which simultaneously serves as a drain groove. It is also possible to arrange a pad-wear warning arrangement in space 5. The space 5 defines an axis of symmetry with respect to which the two recesses 2 and 2' and friction pads 3 and 3' are in symmetry such that they approximately form a sector of a circle.

Figure 3:
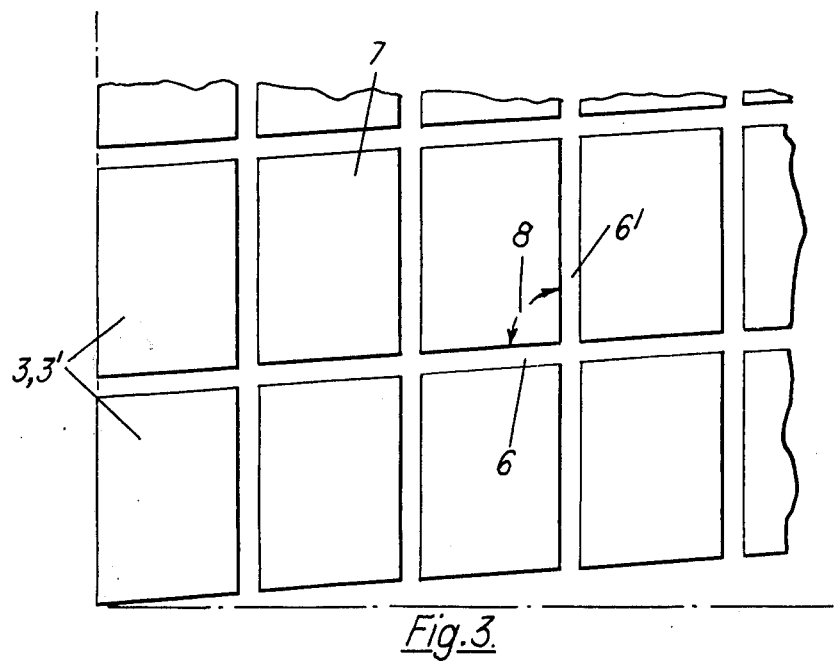
FIG. 3 shows how friction pads are cut out of a plate of friction material in accordance with the principles of the present invention.

In FIG. 3, a portion of a plate 7 made from friction material is shown, the thickness of plate 7 corresponding to the thickness of the friction pads 3 and 3' and from which friction pads 3 and 3' are cut out in their final forms by parallel parting lines 6 and 6' which run in longitudinal and transverse direction of plate 7. Parting lines 6 and 6' run at angles 8 unequal to 90° so that the friction pads 3 and 3' have the shape of parallelograms other than a rectangle.

While we have described above the principles of our invention in connection with specific apparatus it is to be clearly understood that this description is made only by way of example and not as a limitation to the scope of our invention as set forth in the objects thereof and in the accompanying claims.

We claim:

1. A method of manufacturing a brake-pad assembly for a spot-type disc brake having a carrier plate and a pair of friction pads comprising the steps of:

forming separately a pair of spaced recesses in said carrier plate, said recesses having a parallelogram configuration other than a rectangle and a cross member therebetween providing an axis of symmetry, said recesses being symmetrically disposed with respect to said axis of symmetry to approximate a sector of a circle;

pressing and age-hardening separately a plate of friction material having a thickness corresponding to the desired thickness of said pads;

cutting at least said pair of pads separately from said plate having the dimensions and shape of said recesses; and placing and securing each of said pair of pads produced in said cutting step in a different one of said recesses so that said pair of pads are disposed symmetrically with respect to said axis of symmetry to approximate a sector of a circle.

2. A method according to claim 1, wherein said step of cutting includes the steps of cutting longitudinal parallel parting lines over the whole length of said plate, and cutting transverse parallel parting lines over the whole width of said plate, each of said parallel parting lines intersecting each of said transverse parting lines at an angle other than 90°.

* * * * *